United States Patent Office 2,743,190

Patented Apr. 24, 1956

2,743,190

METHOD FOR PRODUCING EFFECTS ON FABRICS

Fritz Vonaesch, Wattwil, Switzerland, assignor, by mesne assignments, to Joseph Bancroft & Sons Co., Rockford, Wilmington, Del., a corporation of Delaware No Drawing. Application May 13, 1952, Serial No. 287,610

7 Claims. (Cl. 117—11)

This invention relates to a method for producing combined mechanical effects on fabrics and particularly to permanent patterned combined goffered and chintz effects.

Methods for making improved patterned effects are known. Processes for producing glazed chintz effects are also known including passage of the goods through friction calenders. Goffering, as is well understood, produces an embossed or indented design on the fabric. If an ordinary goffered fabric is passed through a friction calender, the goffering is either destroyed or partly destroyed.

The principal object of the present invention accordingly is to provide a simple process for producing a combined goffered and glazed chintz textile fiber. The invention accordingly consists in the novel products as well as the novel processes and steps of processes according to which such products are manufactured, the specific embodiments of which are described hereinafter by way of example and in accordance with which I now prefer to practice the invention.

I have found in accordance with my invention that the desired combined effect may be produced by impregnating a textile fabric containing a permanent patterned goffered effect with an artificial resin precondensate. After such impregnation the so-treated fabric is friction calendered and the precondensate is then cured to produce a combined goffered and chintz effect. The permanent patterned goffered effect is preferably produced by printing an artificial precondensate resin in a pattern on the fabric, goffering the fabric over all, and curing the precondensate in the pattern. The goffered effect is then washed out from the unprinted portion.

The local pattern goffered effect can be produced either by printing the fabric prior to goffering with the artificial resin precondensate as indicated or by impregnating the fabric completely with a solution of artificial resin precondensate and subsequently printing it locally in a pattern with an agent, thus preventing curing of the resin in the pattern. In either case the fabric is thereafter given an all-over goffer and then the resin is cured and the fabric is washed. Where the agent, inhibiting curing, is applied in a pattern the cured precondensate is thereupon washed out. The goffered fabric so treated is then impregnated as indicated above, friction calendered and cured to produce the desired combined goffered and chintz effect.

When treated as indicated above the goffered effect remains substantially unchanged and the fabric acquires in addition the desired glazed chintz effect on the non-goffered areas. This retention of the goffered effect was a surprising result, since it would be expected that subsequent friction calendering of a goffered effect made permanent by a cured resin, would destroy the goffered effect either entirely or at least partially.

I have found in accordance with my invention that the following thermosetting artificial resin precondensates may be employed for the production of the permanent goffered effect and the permanent chintz effect: condensates of formaldehyde and urea, thio-urea, ethylene urea and its homologues, acetylenediureine and its derivatives, dicyandiamide, melamine, phenol and phenol-derivatives, as well as mixtures of these resin components. The precondensates are used together with the usual acid catalysts.

Textiles suitable for treatment in accordance with my invention are primarily cotton fabrics, especially cotton percale; however, also spun rayon and mixed fabrics of cotton and spun rayon can be used.

By the use of predyed, especially printed fabrics as starting materials, and especially dyed artificial resin precondensates as required for the first step of the local fixation of the goffered effects, as well as by the subsequent dyeing of the fabric after the first resin condensation there exists a great possibility of variation in the production of colored effects. Soluble dyestuffs or pigments, as for instance acid dye stuffs, vat pigments, free leuco compounds of vat dyestuffs, sulphuric acid esters of leuco compounds of vat dye stuffs can be added to the locally applied artificial resin precondensates. Furthermore, a resin mass containing a stable diazo compound can be applied on a white or predyed naphtholated ground. The resulting areas of the naphtholated fabric containing no resin can be coupled with a suitable diazo-compound or they can be washed out. The unprinted portion can also be dyed over subsequently with substantive dyestuffs, indigosoles, vat or sulphur dyestuffs. In order to produce gold, silver, or copper effects, a metal powder can be added to the artificial resin precondensate used for the local fixation of the goffering effect, if need be together with dyestuffs or pigments.

A colored patterned goffered effect of a good fastness to crocking can be obtained by using a predyed fabric as starting material on which in the first step of the process a colorless resin mass has been applied locally and from which, after curing of the resin, the color has been eliminated from the areas where no resin had been applied, so that the result thereof is a white ground, which however, if desired, can be dyed again to another shade.

The following examples are illustrative of the invention as I now prefer to practice it. It is to be understood that these examples are illustrative and that the invention is not to be considered as restricted thereto, except as indicated in the appended claims.

*Example 1*

A colorless printing paste of the following composition is applied in a pattern on a white or colored cotton percale fabric:

| | Grams |
|---|---|
| Melamine formaldehyde precondensate | 150 |
| Water | 100 |
| Tragacanth 1:10 | 600 |
| Ammonia conc | 5 |
| Ammonium rhodanide | 20 |
| Water | 125 |
| | 1000 |

After printing the fabric is dried at about 60° C. The fabric is then goffered all over by passing it through an embossing calender at a temperature of about 200° C. The precondensate is then cured by exposing the printed fabric for 4 minutes at a temperature of 140° C. The fabric is then washed out leaving a permanently goffered pattern on a smooth background. In other words such washing removes the goffer from those portions of the fabric to which the colorless precondensate has not been applied. After washing the fabric is dried on a tenter frame. It is then impregnated with a solution containing 150 grams of melamine formaldehyde precondensate per litre and predried at approximately 60° C. It is then passed through a friction calender as employed in producing chintz effects. The melamine formaldehyde precondensate is then cured at 140° C. for 4 minutes and the fabric so treated is then stentered.

A very characteristic goffered effect together with a sparkling chintz effect on the non-goffered areas is obtained.

*Example 2*

A white or colored cotton fabric is padded with the following solution:

| | Grams |
|---|---|
| Urea formaldehyde precondensate | 120 |
| Ammonia conc | 5 |
| Carob bean meal thickener 25:1000 | 50 |
| Ammonium chloride | 10 |
| Water | 815 |
| | 1000 |

The fabric is then dried on a stenter. The fabric is then printed in a design with a reserve consisting of

| | Grams |
|---|---|
| Potassium carbonate | 50 |
| Water | 350 |
| British gum 1:1 | 600 |
| | 1000 |

serving to prevent curing of the resin precondensate upon subjecting the fabric to a temperature sufficient to cure the urea formaldehyde precondensate. The fabric is then dried again. The fabric is then goffered all over on a calender as in Example 1 and the urea formaldehyde precondensate is cured by heating the fabric to 120° C. for 10 minutes. The fabric is then washed out and dried.

A locally permanently goffered fabric is obtained. Those parts of the fabric printed with the reserve appear plain with no permanent goffered effect, while the remainder of the fabric shows such effect.

The fabric is now impregnated directly by a solution of 120 grams of urea formaldehyde precondensate per litre and finished to give a chintz effect on the non-goffered areas as described in Example 1.

Prior to applying the solution of urea-formaldehyde precondensate the fabric can be over-dyed with a suitable color, if desired, followed by impregnation and the production of the chintz effect mentioned.

A pronounced white or colored goffered effect is obtained on a sparkling white or colored background with a chintz effect.

*Example 3*

A white or dyed spun rayon fabric is printed in a pattern with the following colorless printing mass:

| | Grams |
|---|---|
| Dimethylolethylene urea precondensate | 150 |
| Water | 200 |
| Ammonia conc | 5 |
| Carob bean meal thickener 25:1000 | 600 |
| Ammonium chloride | 5 |
| Water | 40 |
| | 1000 |

After printing the fabric is dried at about 60° C. It is then goffered on a hot embossing calender as in Example 1, and the precondensat is cured for 4 minutes at a temperature of 140°. It is then washed out, dried, and stentered. From those portions of the pattern which do not contain the cured resin the goffered effect is removed. Thereupon the fabric is impregnated with a solution containing 150 grams of dimethylolethylene urea precondensate. It is pre-dried at approximately 60° C., submitted to friction calendering as in Example 1, cured, washed and stentered.

The white or dyed fabric may be dyed on those non-goffered portions of the pattern before the second treatment with resin precondensate, followed by such treatment to produce the chintz effect.

According to the treatment a pronounced white or colored goffered effect is obtained together with a white or colored chintz effect on the non-goffered background.

*Example 4*

A white cotton calico fabric is printed in a pattern with a colored paste of the following composition:

| | Grams |
|---|---|
| Melamine formaldehyde-precondensate | 150 |
| Water | 60 |
| Indanthrene-blue GCD (Schultz Index No. 1234) in | 30 |
| Water well dispersed | 30 |
| Softener, dissolved in | 40 |
| Water | 65 |
| Ammonia conc | 5 |
| Carob bean meal thickener 25:1000 | 600 |
| Ammonium rhodanide | 20 |
| | 1000 |

After printing the fabric is dried at about 60° C. It is then goffered all over by passing it through a heated embossing calender as in Example 1. The goffered fabric is then heated for 4 minutes at a temperature of 140° C. to cure the precondensate. The fabric is then washed out and stentered. In the washing process the goffered effect is removed from those parts of the fabric which do not contain the cured resin composition. Subsequently the so-treated fabric is impregnated with a solution of malamine resin precondensate as in Example 1, dried, submitted to friction calendering, cured, washed out and stentered.

Instead of printing with one colored printing paste as above several colored pastes can be printed simultaneously on the fabric by means of a multicolor printing machine. Such pastes are of the same composition as given in this Example 4 above except that they contain different colors. That is, instead of Indanthrene-blue GCD, for example, Indanthrene yellow GK (Schultz Index No. 1220) or Indanthrene red 5 GK (Schultz Index No. 1218) is employed. After printing with several colors the procedure is the same as given above for treatment of the fabric printed with one color.

Thus very pronounced goffered effects in different colors, on a white, or on a colored frictioned ground can be obtained.

Metal powder as for instance gold-bronze or aluminum-bronze may be added to the printing mass as desired together with colored pigments or to replace same.

*Example 5*

A colored cotton percale fabric is printed in a pattern with a composition as described in Example 1 and then predried, goffered all-over and cured as in Example 1. After washing the fabric, the color is eliminated from the areas where no resin has been applied by treating the fabric with a solution containing 3 to 5 grams hydrosulphite powder and 3 grams sodium carbonate per litre at a temperature of about 60 to 100° C. Thereafter the fabric is washed, if desired, dyed again to another shade and rinsed. The fabric is then dried on a tenter frame, impregnated with a solution containing 150 grams of melamine formaldehyde precondensate per litre and finished to give a chintz effect on the non-goffered areas as described in Example 1.

*Example 6*

A white cotton fabric is padded with a solution containing 10 grams Naphtol AS (β-oxynaphtholic acid anilide) per litre, dried and printed in a pattern with the following printing mass:

| | Grams |
|---|---|
| Lyofix CH, a melamine formaldehyde precondensate of Ciba | 165 |
| Water | 90 |

| | Grams |
|---|---|
| Soromin HS (cationic active fatty acid condensation product) | 50 |
| Ammonia conc. | 5 |
| Thylose TWA (alkyl ether of cellulose) 50:1000 | 500 |
| Ammonium rhodanide | 7 |
| Fast red salt B (5-nitro-o-anisidin) | 42 |
| Water | 141 |
| | 1000 |

In the printing process, coupling between the diazo-compound and the naphthol-compound takes place and a red pattern on a white background is obtained. After drying, the fabric is goffered all-over and cured as described in Example 1. The fabric is then treated with a solution containing 30 grams Variamin blue salt (diazo-compound of 4-amino-4′-methoxydiphenylamine) to develop the naphthol-compound on the areas containing no resin to a blue shade. Thereafter the fabric is washed out, soaped, rinsed and dried.

The fabric is then padded with a solution containing 100 grams melamine formaldehyde precondensate per litre, dried, submitted to friction calendering, cured, washed out with hot and cold water and stentered.

Thus a red goffered effect is obtained on a sparkling blue chintzed background.

What I claim is:

1. A process which comprises producing a goffered effect in a textile fabric in a pattern with such pattern area impregnated with an artificial resin precondensate, friction calendering the fabric so treated and condensing the precondensate, to produce a combined goffered and chintz effect.

2. A process which comprises printing an artificial precondensate resin in a pattern on a textile fabric, goffering the fabric over-all, condensing the precondensate in the pattern, washing out the goffered effect from the unprinted portion of the fabric, impregnating the patterned goffered fabric with an artificial resin precondensate, friction calendering the fabric so treated containing the precondensate and finishing the fabric to produce a combined goffered and chintz effect.

3. A process in accordance with claim 1 in which the artificial resin precondensate is selected from the group consisting of melamine formaldehyde precondensate, urea formaldehyde precondensate and urea dimethyloldiethylene.

4. A process in accordance with claim 2 in which a coloring substance is added to the precondensate employed in forming the patterned goffered effect.

5. A process according to claim 2 in which a metal powder is added to the precondensate employed for producing the patterned effect.

6. A process in accordance with claim 2 in which the textile fabric containing the goffered effect is a pre-dyed fabric and in which the dye substance is eliminated from the pattern in those parts not covered by the condensed resin employed in producing the local goffered effect.

7. A textile fabric having a water insolubilized thermosetting resin therein with a permanent pattern goffered effect and with a glazed chintz effect on the non-goffered areas.

References Cited in the file of this patent

UNITED STATES PATENTS

| | | |
|---|---|---|
| 2,103,587 | Lantz et al. | Dec. 28, 1937 |
| 2,119,150 | Bowen et al. | May 31, 1938 |
| 2,123,153 | Rivat | July 5, 1938 |
| 2,148,316 | Lippert | Feb. 21, 1939 |
| 2,454,391 | Jones et al. | Nov. 23, 1948 |
| 2,461,603 | Hunter et al. | Feb. 15, 1949 |
| 2,577,957 | Farnworth et al. | Dec. 11, 1951 |